(12) United States Patent
Huang et al.

(10) Patent No.: US 10,097,485 B2
(45) Date of Patent: Oct. 9, 2018

(54) SYSTEM AND METHOD TO DELIVER EMAILS AS EXPRESSIVE CONVERSATIONS ON MOBILE INTERFACES

(71) Applicant: MAILTIME TECHNOLOGY INC., San Francisco, CA (US)

(72) Inventors: He Huang, San Francisco, CA (US); Chun Kit Lau, San Francisco, CA (US)

(73) Assignee: MAILTIME TECHNOLOGY INC., San Francisco, CA (US)

( * ) Notice: Subject to any disclaimer, the term of this patent is extended or adjusted under 35 U.S.C. 154(b) by 74 days.

(21) Appl. No.: 15/076,840

(22) Filed: Mar. 22, 2016

(65) Prior Publication Data
US 2016/0294759 A1 Oct. 6, 2016

Related U.S. Application Data

(60) Provisional application No. 62/142,476, filed on Apr. 3, 2015.

(51) Int. Cl.
*G06F 15/16* (2006.01)
*H04L 12/58* (2006.01)

(52) U.S. Cl.
CPC .................. *H04L 51/063* (2013.01)

(58) Field of Classification Search
CPC ....... G06N 99/005; H04L 51/16; H04L 51/36; H04L 51/063; H04L 67/20
See application file for complete search history.

(56) References Cited

U.S. PATENT DOCUMENTS

| | | | |
|---|---|---|---|
| 7,908,647 B1* | 3/2011 | Polis | G06F 17/30997 713/151 |
| 2012/0054646 A1 | 3/2012 | Hoomani | |
| 2013/0086699 A1* | 4/2013 | Polis | H04L 63/10 726/29 |
| 2014/0006525 A1* | 1/2014 | Freund | H04L 51/16 709/206 |
| 2015/0026104 A1* | 1/2015 | Tambos | H05B 33/0857 706/12 |
| 2015/0120555 A1* | 4/2015 | Jung | G06Q 20/40 705/44 |
| 2015/0261946 A1* | 9/2015 | Yoon | G06F 21/34 726/19 |
| 2015/0309992 A1* | 10/2015 | Visel | G06F 17/2785 704/9 |
| 2016/0283168 A1* | 9/2016 | Osadchyy | G06F 3/1205 |

* cited by examiner

*Primary Examiner* — Richard G Keehn
(74) *Attorney, Agent, or Firm* — Inventive Law Inc.; Jim H. Salter

(57) ABSTRACT

A computer-implemented system and method for reformatting and delivering emails as conversations. The computer-implemented method includes: synchronizing with an email service and receiving an email message via a data network; parsing content of the received email message to identify and suppress email content not related to conversational content and retaining the conversational content; reformatting the received email message to include the conversational content in a chat style format as an expressive conversation; making the expressive conversation available to a client email application; and presenting the expressive conversation to a user via the client email application.

20 Claims, 14 Drawing Sheets

```
MIME-Version: 1.0
Received: by 10.36.204.131 with HTTP; Tue,                         15:08:36 -800 (PST)
X-Orginating-IP: [50.78.104.209]
In-Reply-To:    <CACDpR3d2C-JhPuUJkfYliMPuZMot0oRzLEUY+al+uaeWG9olig@mail.gmail.com>
References:     <CABCoJKRvLuBMCM4n14stcsw6mxFHVrxXLnRJVzDNzxRj0iqPSw@mail.gmail.com>
                <CACDpR3d2C-JhPuUJkfYliMPuZMot0oRzLEUY+al+uaeWG9olig@mail.gmail.com>
Date: Wed,              07:08:36  +0800
Deliverd-To:  hockey@mailtime.com
Message-ID:   <CABCoJKRvLuBMCM4n14stcsw6mxFHVrxXLnRJVzDNzxRj0iqPSw@mail.gmail.com>
Subject:  Re:  Lite cloud API
From:  Hockey Cheng  <hockey@mailtime.com>
To:  Evan Lee  <evan@mailtime.com>
Cc:  Gary Lau  <gary@mailtime.com>,  Frank Hu  <frank@mailtime.com>,
     Peter Fang  <peter@mailtime.com>,  Woody Huang  <woody@mailtime.com>
Content-Type:  multipart/alternative;  boundary=001a11c14f34783abe052c7807d9

--001a11c14f34783abe052c7807d9
Content-Type:  text/plain;  charset=UTF-8 https://mailtime.atlassian.net/wiki/display/BAC/API+Document

On Wed,                at  5:12 AM,  Evan Lee  <evan@mailtime.com>  wrote:

> Dude there is no attachment
>
> On Tue,                at  5:43 AM,  Hockey Cheng  <hockey@mailtime.com> wrote:
>
>> Hi all,
>>
>> Here's our draft for API format.
```

Fig. 8

SYSTEM AND METHOD TO DELIVER EMAILS AS EXPRESSIVE CONVERSATIONS ON MOBILE INTERFACES

PRIORITY PATENT APPLICATION

This is a non-provisional patent application claiming priority to U.S. provisional patent application, Ser. No. 62/142,476; filed Apr. 3, 2015 by the same applicant as the present application. This present patent application draws priority from the referenced patent applications. The entire disclosure of the referenced patent applications is considered part of the disclosure of the present application and is hereby incorporated by reference herein in its entirety.

TECHNICAL FIELD

Embodiments of the disclosure relate generally to the field of email processing. Embodiments relate more particularly to a computer-implemented system and method to reformat and deliver emails as expressive conversations on a mobile interface.

BACKGROUND

Electronic mail (email) was originally designed for computers and is one of the most commonly used communication tool. Email aids to communicate/exchange digital messages from an author to one or more recipients. Each email is composed of title, content, signature and metadata. In scenarios of multiple replies, emails display repeated information which turns out to be inconvenient to those who read.

Today, emails have survived on mobile phones. However, the display of emails on computers and mobile phones remains unchanged. Several email applications attempt to optimize the display of emails for mobile phones by randomly selecting parts of emails to display. The readers are then required to click again in order to view the entire text.

Predominately, existing technology for displaying emails is a mere translation of the desktop paradigm. The reader of the email must scroll through multiple lines in a cluster in order to reach the actual conversational email content. Occasionally, the display of the multiple lines puzzles the reader. Various email applications work exclusively to improve the display of emails by myriad sorting, archiving and delaying options. However, none of the existing technology and email applications intent to alter the messaging style of emails.

In the light of the above discussion, there appears to be a need delivering emails with different messaging style on mobile phones.

SUMMARY

The above-mentioned needs are met by a computer-implemented system and method to deliver emails as expressive conversations on mobile interfaces.

A computer-implemented method for delivering emails as expressive conversations on mobile interfaces. The computer-implemented method includes recognizing email closings, unnecessary data and signature lines in an email thereby identifying email content. Further, the computer-implemented method includes hiding the recognized email closings, unnecessary data and signature lines from the email and subsequently retaining the email content.

Furthermore, the computer-implemented method includes delivering a reformatted and condensed email to a user, the reformatted email is composed of a bubble chat style format. Moreover, the computer-implemented method includes allowing the user to view the email as a conversation similar to text messaging on a mobile interface. The computer-implemented method also includes allowing the user to sort, add and remove email recipients displayed in a group chat list and includes enabling the user to assign tasks to one or more participants during the conversation.

An object of the embodiments herein is to provide a computer-implemented method for identifying and hiding unnecessary email metadata while retaining the email content. Another object of the embodiments herein is to deliver the email as a conversation on a mobile interface using bubble chat style format.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

In the accompanying figures, similar reference numerals may refer to identical or functionally similar elements. These reference numerals are used in the detailed description to illustrate various embodiments and to explain various aspects and advantages of the present embodiments.

FIG. 8 illustrates an example of a typical email message, including the signatures and metadata;

DETAILED DESCRIPTION OF EXAMPLE EMBODIMENTS

The above-mentioned needs are met by a computer-implemented system and method for reformatting and delivering emails as conversations on mobile interfaces. The following detailed description is intended to provide example implementations to one of ordinary skill in the art, and is not intended to limit the invention to the explicit disclosure, as one or ordinary skill in the art will understand that variations can be substituted that are within the scope of the invention as described and claimed.

System Block Diagram

Figure 1:
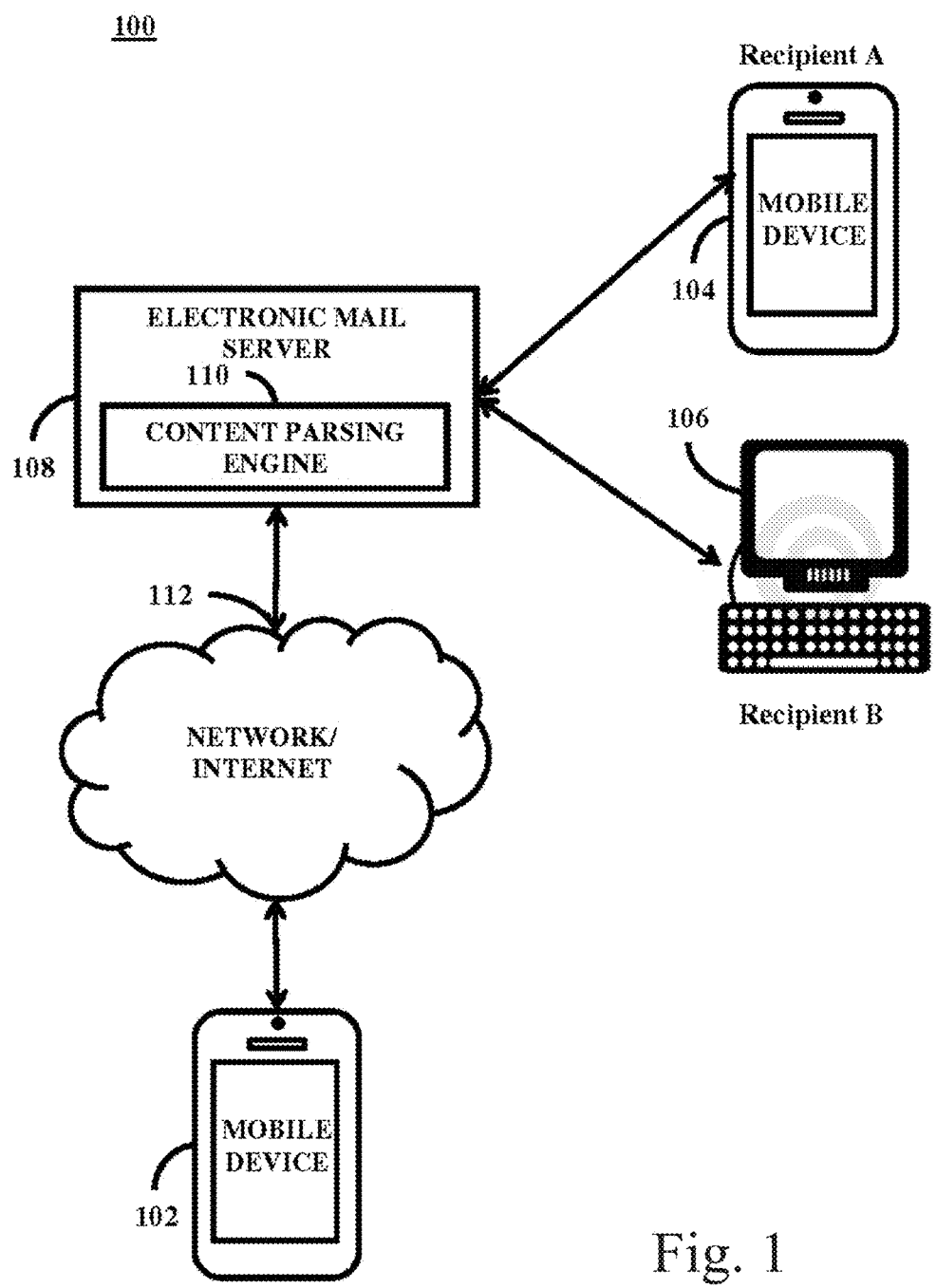
FIG. 1 is a block diagram of the environment, according to the embodiments as disclosed herein.

FIG. 1 is a block diagram of the environment, according to the embodiments as disclosed herein. The environment 100 includes a mobile device 102, a plurality of recipients, for example recipient A 104 and a recipient B 106 and an electronic mail server 108 connected together through a network 112. Further, the electronic mail server 108 includes a content parsing engine 110. The mobile device 102 is a handheld portable computing device (for example, a smart phone) and includes a processor, random access memory (RAM) and an input device such as keyboard, touchpad or input buttons and a display. The keyboard can be integrated with the display, such as a touch sensitive display. The recipient A 104 and recipient B 106 are users of the corresponding devices as shown in FIG. 1. The devices are any portable computing device configured to communicate through emails. The electronic mail server 108 is also a portable computing device. Examples of the portable computing device include, but are not limited to, a personal computer (PC), laptops, a mobile phone, a tablet device, a personal digital assistant (PDA), a smart phone and a laptop. A User of the mobile device 102, recipient A 104 and recipient B 106 are intended to exchange emails with each other through the network/Internet 112.

Further, the electronic mail server 108 includes a content parsing engine 110. The content parsing engine 110 is responsible for hiding or suppressing email closings, unnecessary data and signature lines from the email while retaining the email content. Additionally, the content parsing engine 110 is responsible to re-format the email using a bubble chat style format thereby converting the email as an expressive conversation. In some embodiments, any other suitable chat-style format may be used to present the email as an expressive conversation. The content parsing engine 110 is configured with a non-transitory computer-readable medium (content parsing algorithm), the contents of which causes the electronic mail server 108 to perform the method disclosed herein.

It should be appreciated by those of ordinary skill in the art that FIG. 1 depicts the mobile device 102 and the electronic mail server 108 in an oversimplified manner, and a practical embodiment may include additional components and suitably configured processing logic to support known or conventional operating features that are not described in detail herein.

The content parsing engine 110 recognizes email closings, unnecessary data and signature lines in emails that are communicated to the user of the mobile device 102. Consequently, the actual conversational email content is identified and retained by hiding the recognized email closings, unnecessary data and signature lines. The actual conversational email content is delivered to the user as an expressive conversation similar to text messaging. Typically, the conversation is presented in a bubble chat style format. Accordingly, the user is enabled to read the emails quicker and effectively.

Operational Flow Chart

Figure 2:
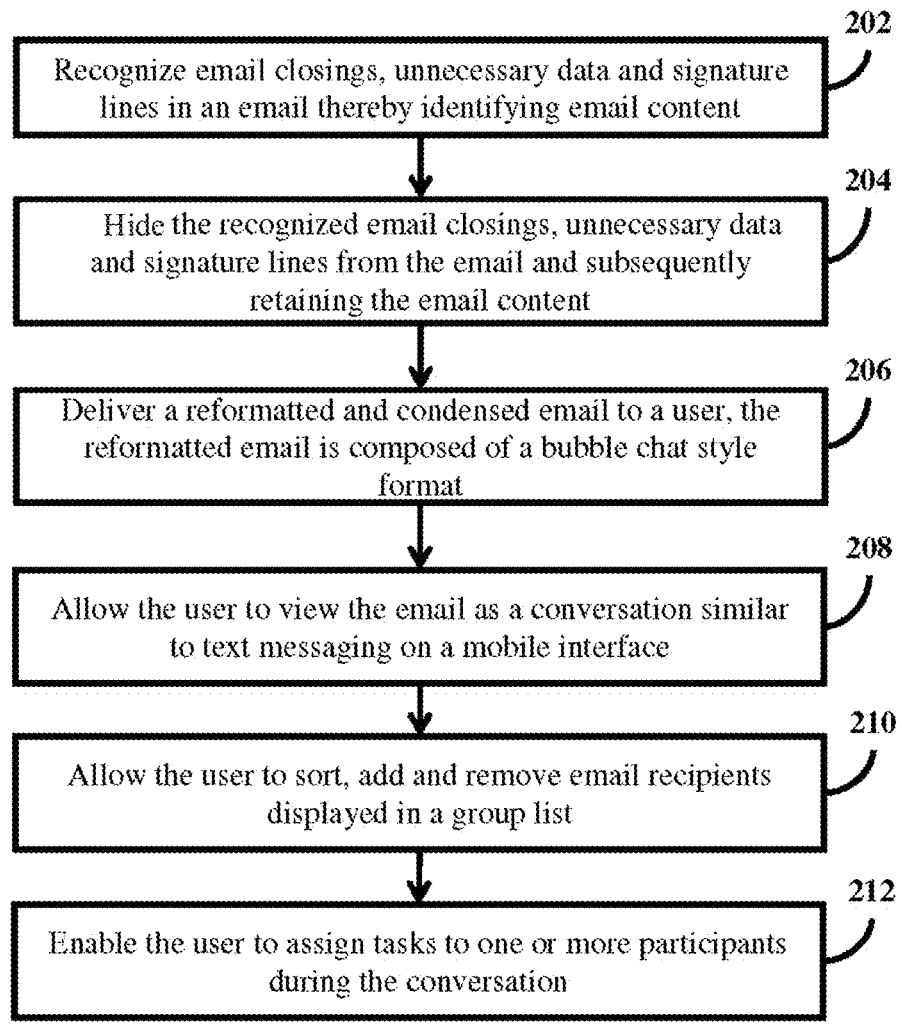
FIG. 2 is a flow chart describing a method for delivering emails as expressive conversations on mobile interfaces, according to the embodiments as disclosed herein.

FIG. 2 is a flow chart describing a method for reformatting and delivering emails as expressive conversations on mobile interfaces, according to the embodiments as disclosed herein. The method begins at step 202. At step 202, email closings, unnecessary data and signature lines in an email are recognized. Consequently, the actual conversational email content is identified. The email closings includes words such as, "Regards", "Cheers", "Best Regards" and "Thanks". The unnecessary data includes salutations such as, "Greetings" and "Warmest Regards", To list, CC list, BCC list and irrelevant replies. Signature lines are a few lines describing the sender of the email such as, "John Doe, Vice President of Marketing"). At step 204, the recognized email closings, unnecessary data and signature lines are hidden from the email thereby retaining the email content. At step 206, a reformatted and condensed email is delivered to a user. The reformatted and condensed email is composed of a bubble chat style format. The bubble chat style format displays bubbles similar to comic balloons with the text of each user who participates in the conversation. Each response of the users appears in the bubble. The bubbles appear on the right side, left side or on alternative sides of the mobile interface, depending on the user who enters the text. At step 208, the user is allowed to view the email as a conversation similar to text messaging on a mobile interface. The user views the exchange of emails and can clearly understand the conversation without getting distracted by the unnecessary data such as CC lists, signatures and replies. At step 210, a list of email recipients are displayed to the user. The list resembles a group chat and allows the user to sort, add and remove the email recipients. At step 212, the user is enabled to assign tasks to one or more participants during the conversation. A list of participants names are displayed to the user who subsequently selects desired participants to assign tasks. The method ends at step 212.

The method described herein is beneficial in at least the following ways:
1. The users are allowed read emails quicker and effectively as unwanted data is hidden.
2. Overall productivity of the users enhances and allows the users spend time on other pursuits.
3. The users are presented with a smooth and easy experience while reading emails on their mobile devices.

Example Illustrations

Figure 3:
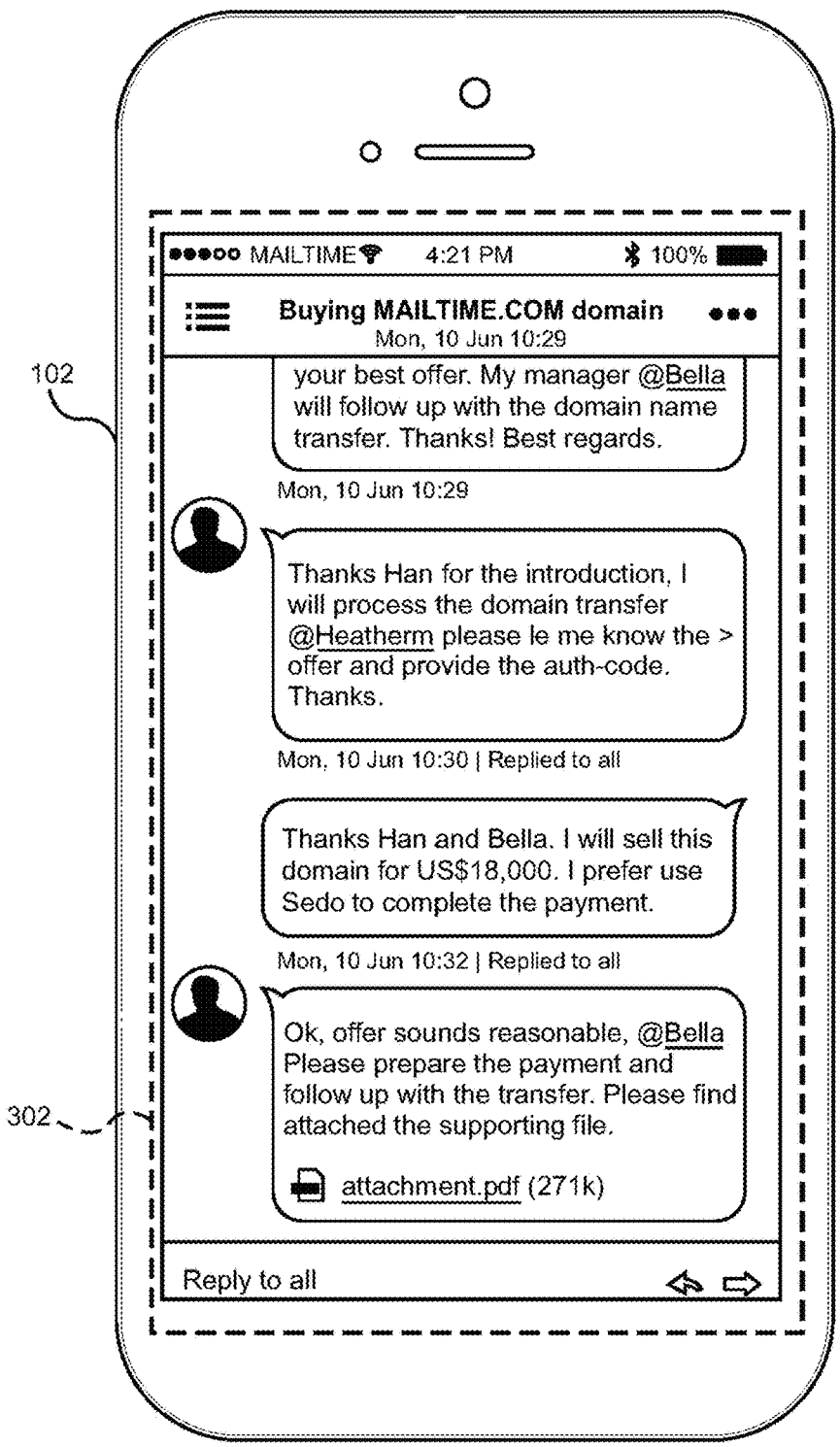
FIG. 3, FIG. 4, and FIG. 5 are example representations illustrating the email as an expressive conversation, according to the embodiments as disclosed herein.
Figure 4:
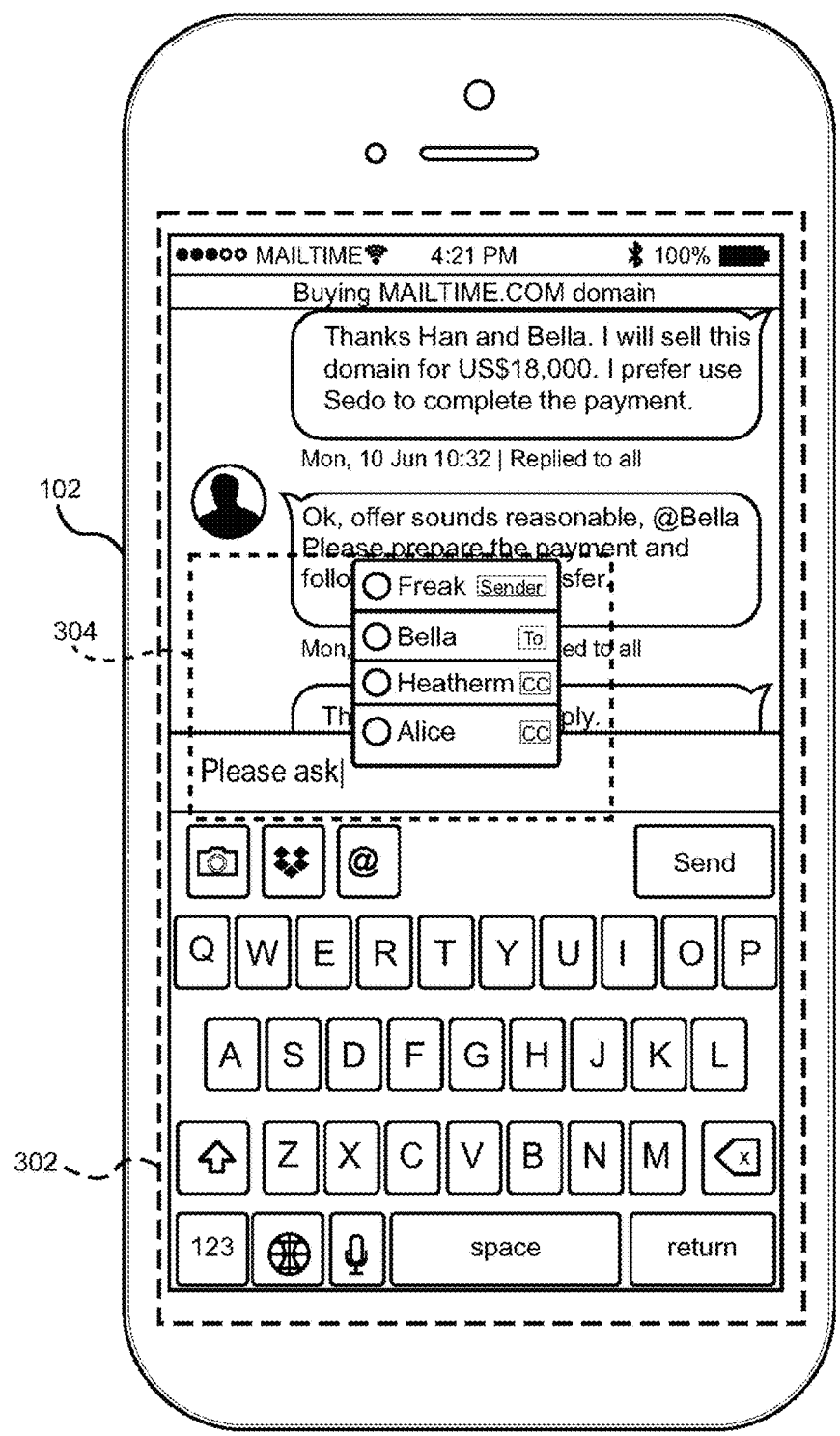
Figure 5:
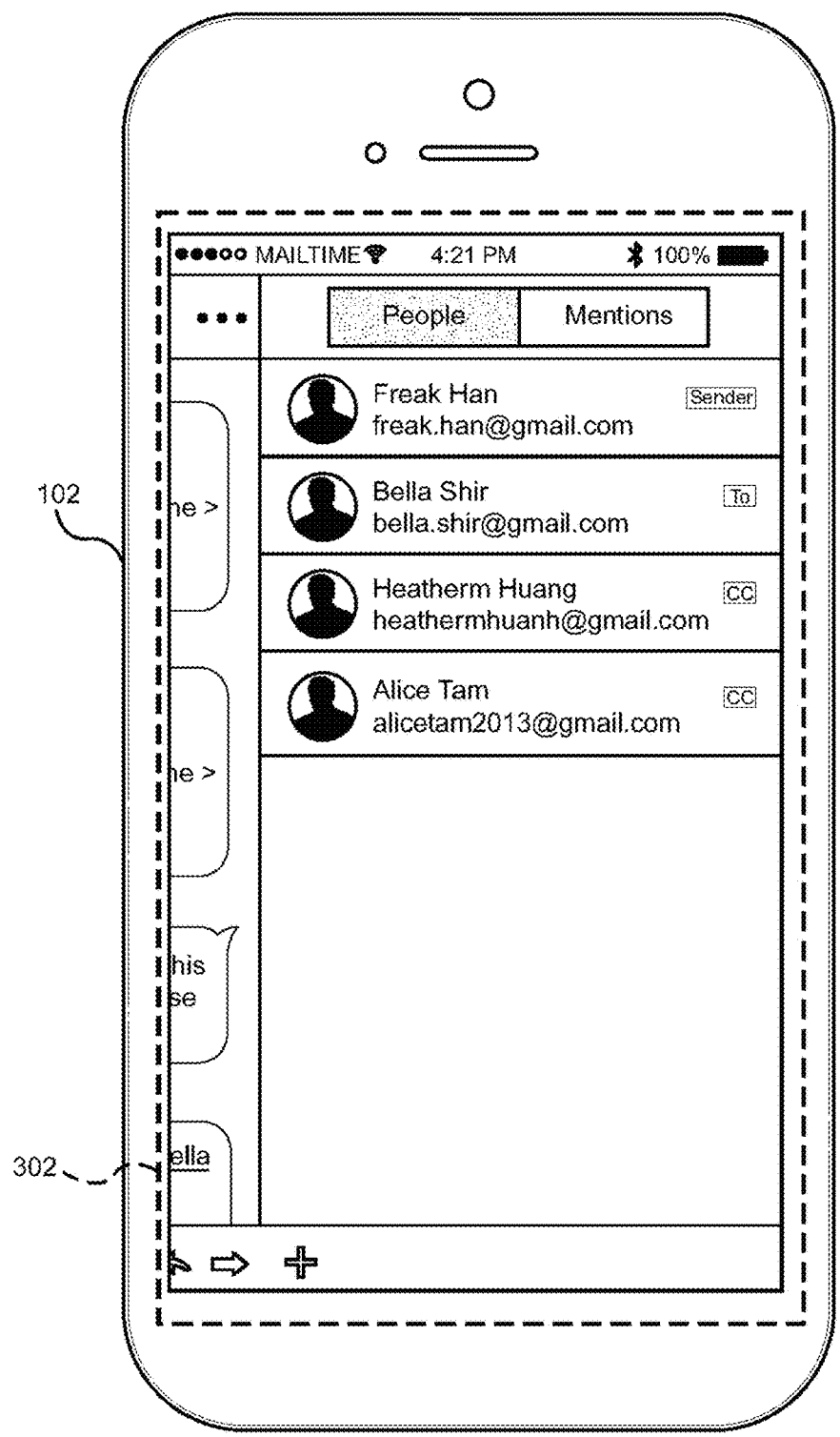

FIG. 3, FIG. 4 and FIG. 5 are example representations illustrating the email as a conversation, according to the embodiments as disclosed herein.

FIG. 3 illustrates the example mobile interface 302 on the mobile device 102 as described in FIG. 1. The mobile interface 302 presents the emails received by the user as a conversation. The conversation appears similar to that of text messaging in a bubble chat style format.

FIG. 4 illustrates the example mobile interface 302 on the mobile device 102 as described in FIG. 1. The mobile interface 302 allows the user to assign tasks 304 in emails by mentioning the concerned users.

FIG. 5 illustrates the example mobile interface 302 on the mobile device 102 as described in FIG. 1. A list of email recipients are displayed to the user resembling a group chat display. The mobile interface 302 allows the user to sort, add and remove email recipients easily from the list.

System Block Diagram

Figure 6:
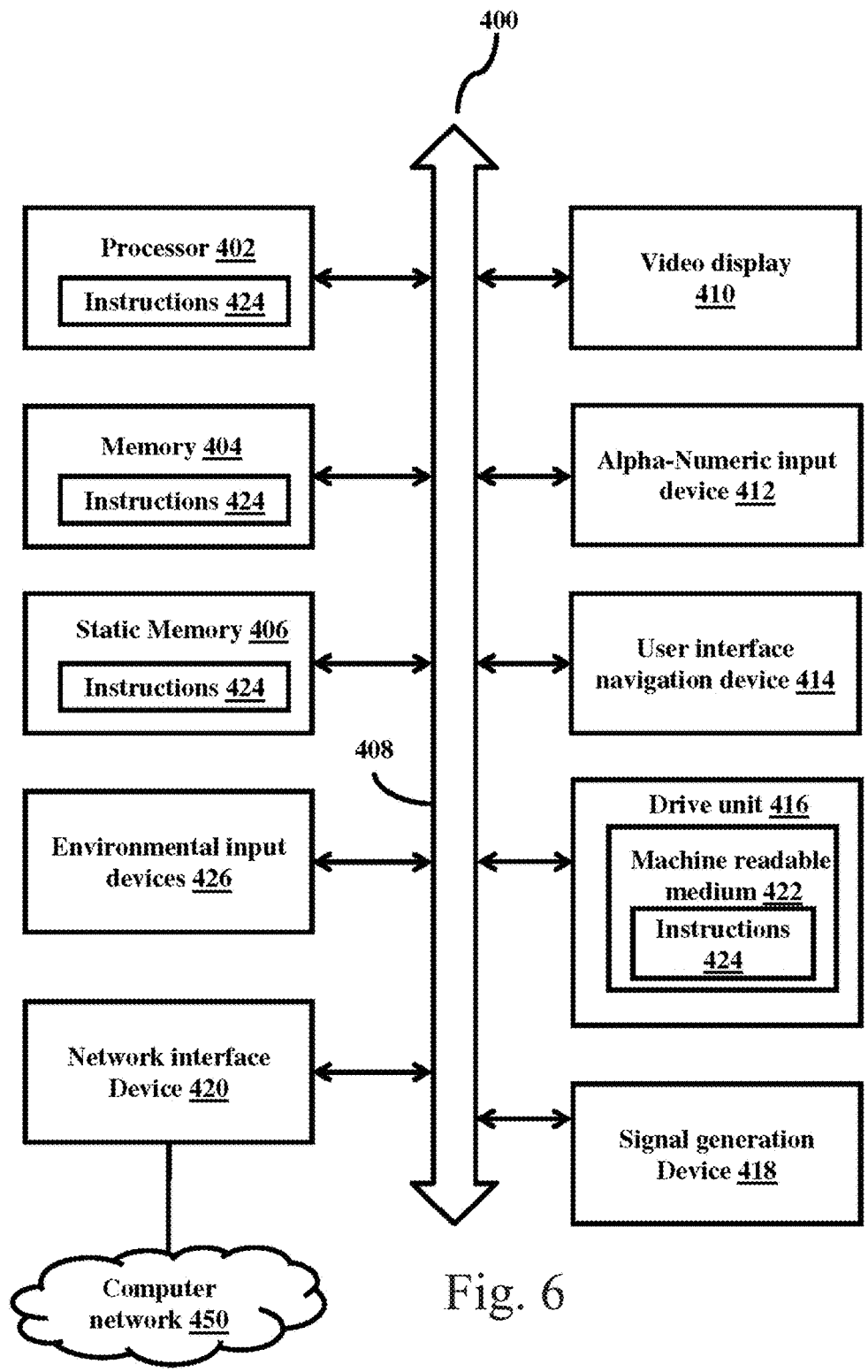
FIG. 6 is a block diagram of a machine in the example form of a computer system within which instructions for causing the machine to perform any one or more of the methodologies discussed herein may be executed.

FIG. 6 is a block diagram of a machine in the example form of a computer system 400 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU), or both), a main memory 404, and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker), and a network interface device 420.

The computer system 400 may also include an environmental input device 426 that may provide a number of inputs describing the environment in which the computer system 400 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404 and/or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, and/or associated caches and servers) that store the one or more instructions 424 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 424 may further be transmitted or received over a computer network 450 using a transmission medium. The instructions 424 may be transmitted using the network interface device 420 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C, C++, C#, Pascal, Fortran, Perl, Matlab (from MathWorks), SAS, SPSS, JavaScript™, AJAX, and Java™. The computer software product can be an independent application with data input and data display modules. Alternatively, the computer software products can be classes that can be instantiated as distributed objects. The computer software products can also be component software, for example Java Beans or Enterprise Java Beans. Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standard 802.11 including its substandards a, b, e, g, h, i, n, et al.). In one example, signals from the computer can be transferred, at least in part, wirelessly to components or other computers.

Other Example Embodiments

Figure 7:
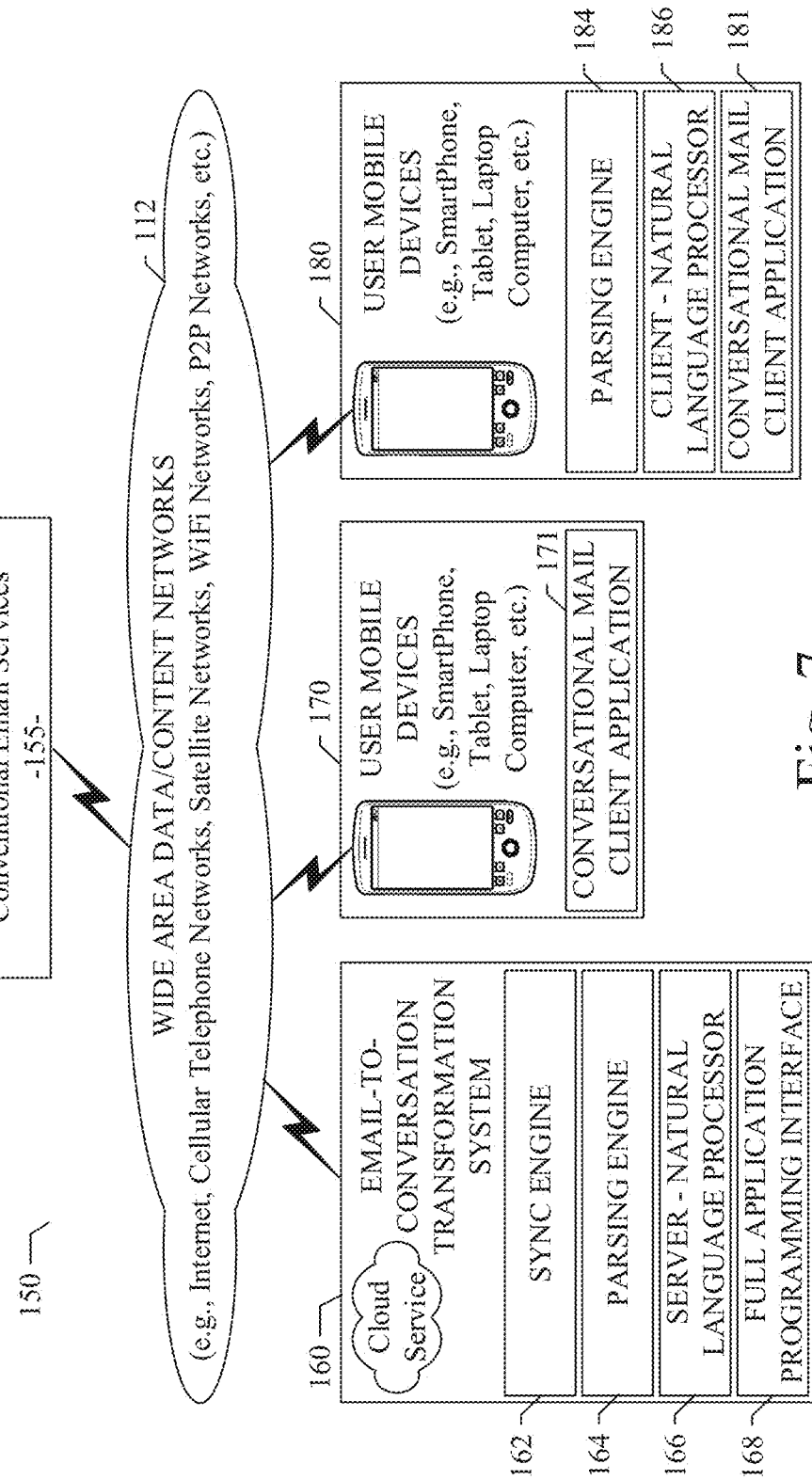
FIG. 7 is a block diagram of the environment of another example embodiment, according to the various embodiments as disclosed herein.

FIG. 7 is a block diagram of the environment 150 in another example embodiment, according to the various example embodiments as disclosed herein. The environment 150 includes a plurality of mobile devices 170 and 180, and a conventional email server 155 implementing standard email services (e.g., Gmail™, Yahoo™, etc.). The mobile devices 170 and 180 and the conventional email server 155 are connected together in data communication through the conventional wide area network 112 (e.g., the Internet). The plurality of mobile devices 170 and 180 can each serve as email senders or email receivers/recipients. The conventional email server 155 represents the standard email server and the standard email services available today.

Referring still to FIG. 7, the mobile devices 170 and 180 can be handheld portable computing or communication devices (for example, a smartphone) and can each include a processor, random access memory (RAM) and an input device such as keyboard, touchpad or input buttons and a display device. The keyboard can be integrated with the display device, such as a touch sensitive display. The mobile devices 170 and 180 can further include a wireless data transceiver for sending and receiving data wirelessly via network 112. The mobile devices 170 and 180 can represent any portable computing or communication device configured to support email communication. Examples of these portable computing or communication devices include, but are not limited to, personal computers (PCs), laptops, mobile phones, smartphones, tablet devices, personal digital assistants (PDAs), wearable devices, and the like. A user of the client mobile device 170 and another user of the client mobile device 180 may intend to exchange emails with each other through the network cloud 112. As described in more detail below, the exchanged emails may be transformed from a standard email format to a robust and expressive conversational or text message/chat-style format using the various embodiments described herein.

Generally, the mobile devices 170 and 180 can include one or more mobile device applications (apps) that process data signals (e.g., email messages) from/to the cloud 112 or other mobile devices. The mobile device applications can produce a user interface with which a user may view, originate, monitor, and/or control the receipt and/or transmission of email by/to the mobile devices 170 and 180. The mobile device application (app) may be loaded, downloaded, or installed on the mobile devices 170 and 180 using conventional processes. Alternatively, the mobile devices 170 and 180 may access email cloud services via the network cloud 112, as described in more detail below. The mobile device application may be written or created to process email messages in the manner described herein for the various embodiments.

Referring still to FIG. 7, the environment 150 of the example embodiment includes an email-to-conversation transformation system 160. In one embodiment, the email-to-conversation transformation system 160 can be implemented as a cloud service supported by a cloud server in data communication with the network 112. In an example embodiment, the email-to-conversation transformation system 160 can include a Sync Engine 162, a Parsing Engine 164, a Server-Natural Language Processor (NLP) 166, and a Full Application Programming Interface (API) 168, all implemented on the cloud server. The Sync Engine 162 is responsible for synchronizing the operation of transformation system 160 and the mobile devices 170 and 180 with the conventional email services 155, such as Gmail™ and Yahoo™. In a particular embodiment, the Sync Engine 162 synchronizes email inbox and outbox changes and updates directly with the conventional email services 155 (e.g., Gmail, Yahoo, etc.) in real time. The Parsing Engine 164 of transformation system 160 is responsible for processing incoming and outgoing email messages, hiding or suppressing email closings, and hiding unnecessary data and signature lines from the email content while retaining the conversational email content. Additionally, the Parsing Engine 164 in an example embodiment is responsible for re-formatting the email content using a bubble chat style format, thereby transforming the email into an expressive conversation. In some embodiments, any other suitable chat-style format may be used to present the email as an expressive conversation. The Parsing Engine 164 uses the processes described herein to extract the essential content and metadata from an email message, hiding the rest of the email data, and transforming email into a familiar text messenger-like view and conversational experience. The Parsing Engine 164 recognizes email closings, unnecessary data and signature lines in emails that are communicated to the users of the mobile devices 170 and 180. In addition to signatures and closings, the Parsing Engine 164 can also identify and suppress extensive automatically-generated information from the entire email. Consequently, the actual conversational email content is identified and retained by hiding the recognized email closings, unnecessary data and signature lines. In a particular embodiment, the Parsing Engine 164 can use machine learning technology to identify the conversational email content, suppress the non-conversational email content, and reformat the conversational email content into a new presentation resembling a text message dialogue. The newly formatted conversational email content is delivered to the user as an expressive conversation similar to text messaging. Typically, the email threads are transformed into a conversation, which is presented in a bubble chat style format on the display device of the mobile devices 170 and 180. Accordingly, the user is enabled to read the transformed emails more quickly and effectively. Further details of an example embodiment are provided below.

Referring still to FIG. 7, the Server-Natural Language Processor (NLP) 166 of transformation system 160 is responsible for using the cloud server to extract information from the content and context of the original emails. Natural language processing techniques can be employed for this extraction. The Full Application Programming Interface (API) 168 of transformation system 160 allows local client uploads and downloads of the parsed email data via the API. The email processing performed by each of these processing modules is described in more detail below.

FIG. 8 illustrates an example of the content of a typical email message, including the signatures and metadata. Note that there is no standard email format. Each email provider has a different style, with default signatures, custom signatures, time settings, routing information, formatting, etc. Note also that the content of traditional email messages, such as the example shown in FIG. 8, is formatted, but still very hard to follow and understand. This is especially true with multiple related email messages in threads with multiple replies and/or forwards. The Parsing Engine 164 of an example embodiment uses machine learning techniques to train on a large data set of the most widely used email service providers and email formats to determine the similarities/models of each of a plurality of email format samples; thus, the Parsing Engine 164 can determine which information content in the email is unnecessary, such as a default signature, reply quote, reply/forward header, etc., and which information is relevant to the conversation between users. In this manner, the Parsing Engine 164 can parse out only the actual conversational content of the message that is useful for presentation as part of the expressive conversation. A large amount of data in the training data set can be used to train the machine learning model of the example embodiments. The model can be periodically retrained to incorporate new data. The various embodiments described herein can check for updates of the model via a network access and download the latest version. The general techniques for training a machine learning model and for generating and updating a training data set are well-known to those of ordinary skill in the art.

Figure 9:
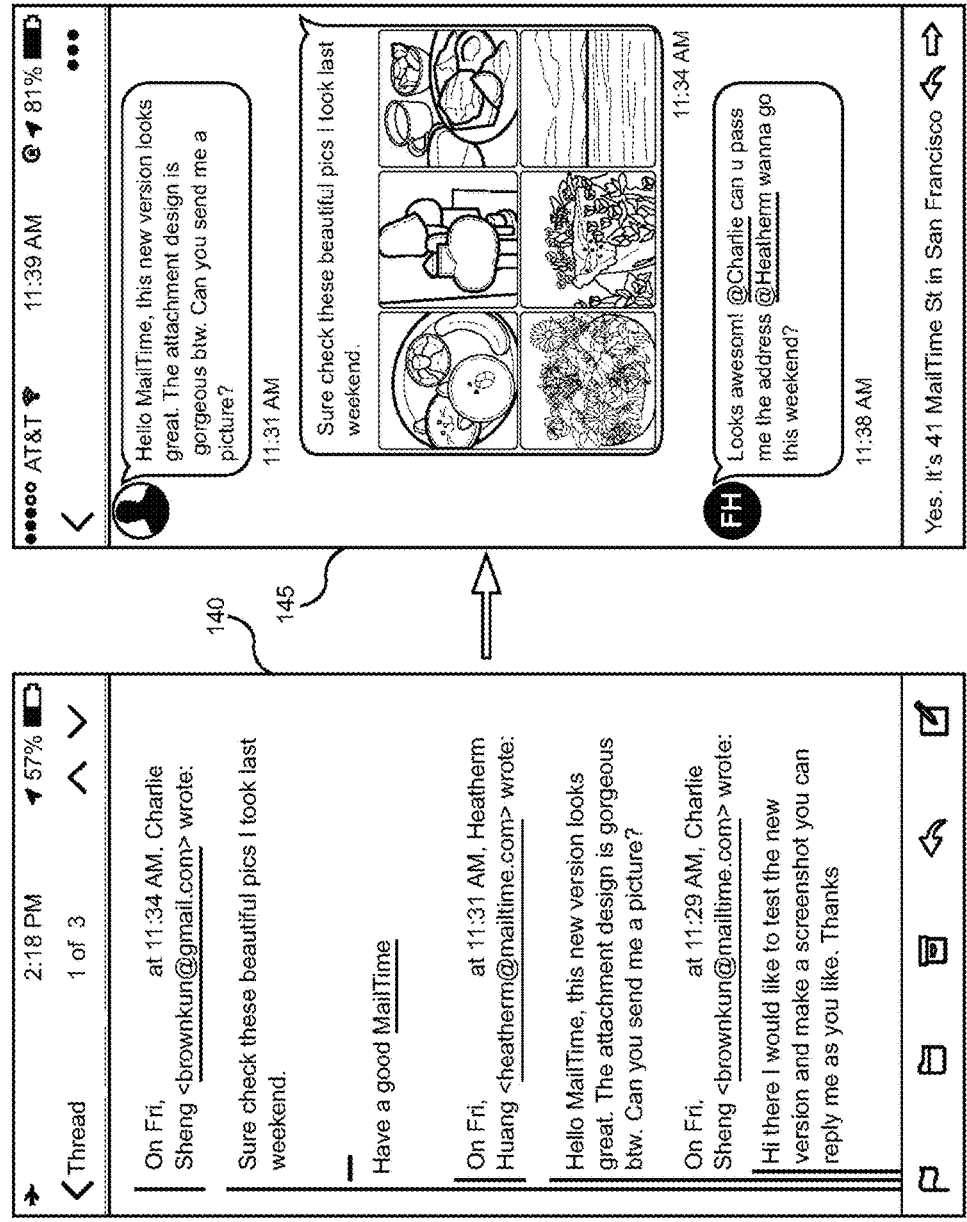
FIG. 9 illustrates the transformation of a typical email thread into a conversation as performed by an example embodiment.

FIG. 9 illustrates the transformation of a typical email thread into an expressive conversation as performed by an example embodiment. FIG. 9 illustrates another example of a traditional email thread 140 formatted in a manner that is commonly presented on a mobile device. The sample email thread 140 format is presented on a mobile device via a traditional email client or client email application, such as the iOS™ Mail app. Note that the email thread 140 is formatted, but still very hard to follow, especially with multiple replies/threads. The conventional email client presentation of the email thread 140 includes a variety of content that is distracting and not useful for the conversation between the mobile device users.

In contrast to the conventional email client presentation of the email thread 140, the corresponding expressive conversation 145 is produced by transformation system 160 of the example embodiments described herein based on the same email thread content as the sample email thread 140 shown in FIG. 9. In the expressive conversation 145, users only see the content of the email, which is relevant to the conversation between users. All other unnecessary information, inefficient formatting, and useless clutter in the email thread is suppressed from the presentation of the expressive conversation by the various embodiments described herein. Also note that any attachments, such as photos, provided with the email thread are integrated into the conversation presentation 145 in the appropriate part of the conversation. The transformation system 160 can generate the conversation presentation 145 after grouping, filtering, and ordering or sorting the various email messages of the email thread so the conversation is presented as temporally sequenced comments by each of the participants or originators of a plurality of email messages in an email thread. The transformation system 160 can also segment, highlight, or add expressive elements to various portions of the conversation based on the context of the message and/or preferences selected by a user. The transformation system 160 can also insert images, pictures, avatars, identifiers, animations, or the like to represent the originators of the particular comments included in the expressive conversation. This provides clarity in the conversation so it is clear who originated the various portions of the conversation. As a result, the expressive conversation 145 generated by the components of the various embodiments described herein provides more than merely a format change. Rather, the transformation system 160 enables a transformation of the whole communication experience between users. This transformation includes the pace and structure of the conversation, the format, the style of the presentation of the expressive conversation 145, and push notifications related to the conversation.

The various embodiments described herein can be implemented in two basic models: 1) a full cloud/light client solution, and 2) a full client/light cloud solution. Each of these two models can be combined and dynamically swapped to optimize resource efficiencies. Because the parsing and natural language processing of the email threads as described above can be processing-intensive operations, the two solutions are offered in the various example embodiments described herein to appropriately allocate processing-intensive operations to devices with a sufficient level of processing and memory storage capability to handle the processing-intensive operations. For example, it would not be appropriate to task a mobile device having minimal processing capability with a large parsing or natural language processing operation that may exceed the capabilities of the device and cause unacceptable latencies. In this case of a minimally capable client device (e.g., a mobile device) or the case of an active user wanting a feature-rich experience, it may be better to allocate the processing-intensive operations remotely to a more capable processing device, such as a cloud server. For this purpose, the full cloud/light client solution is provided and described in more detail below in connection with FIGS. 10 and 11. In other circumstances, the client device may be sufficiently capable to handle the processing-intensive operations and/or the network access between the client device and the cloud may be slow or intermittent. In this case of a sufficiently capable client device (e.g., a mobile device) or the case of an inactive or less active user, it may be satisfactory to allocate the processing-intensive operations locally to the client device. For this purpose, the full client/light cloud solution is provided and described in more detail below in connection with FIGS. 12 and 13.

Figure 10:
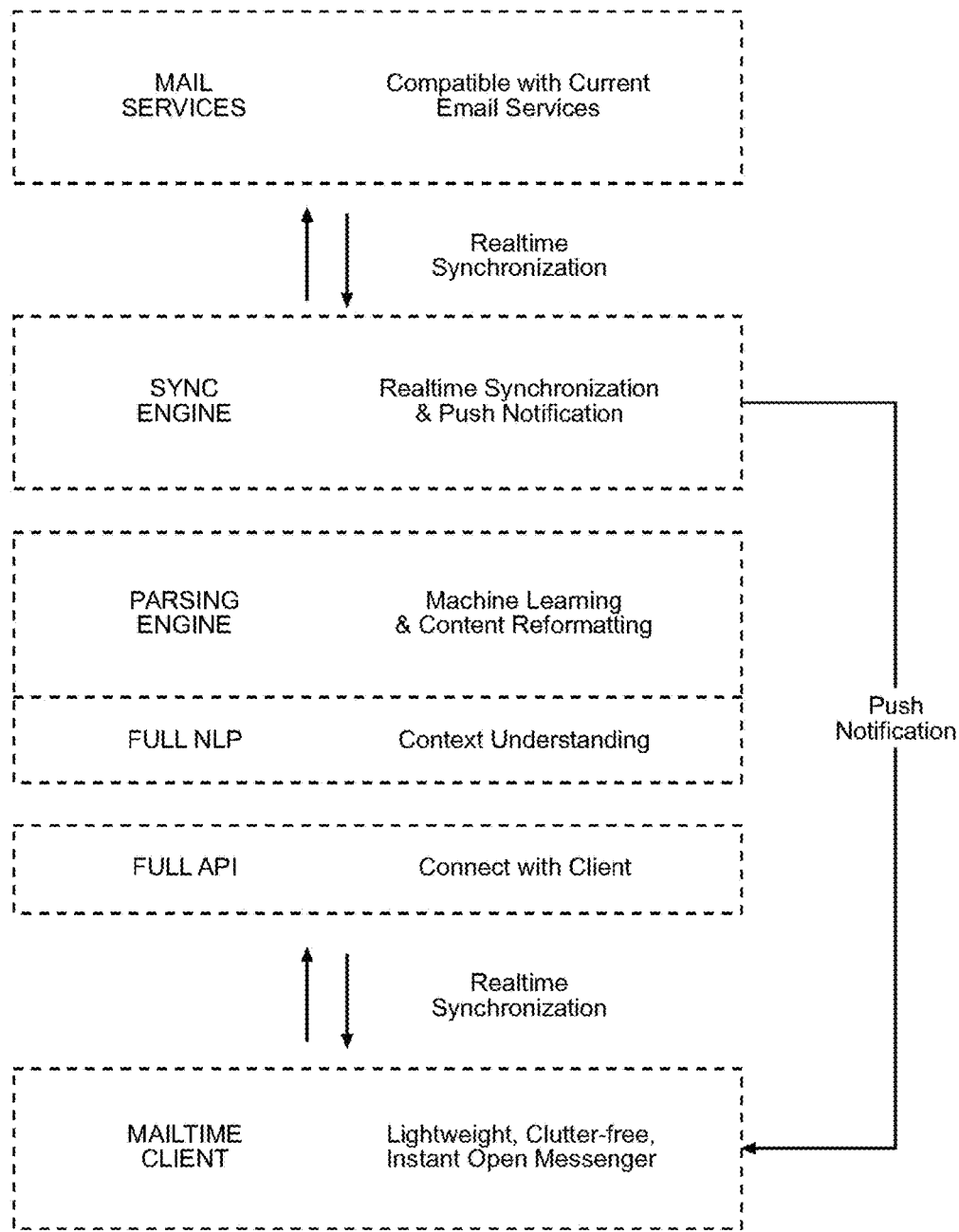
FIGS. 10 and 11 illustrate the processing components of an example embodiment implemented as a full cloud/light client solution.
Figure 11:
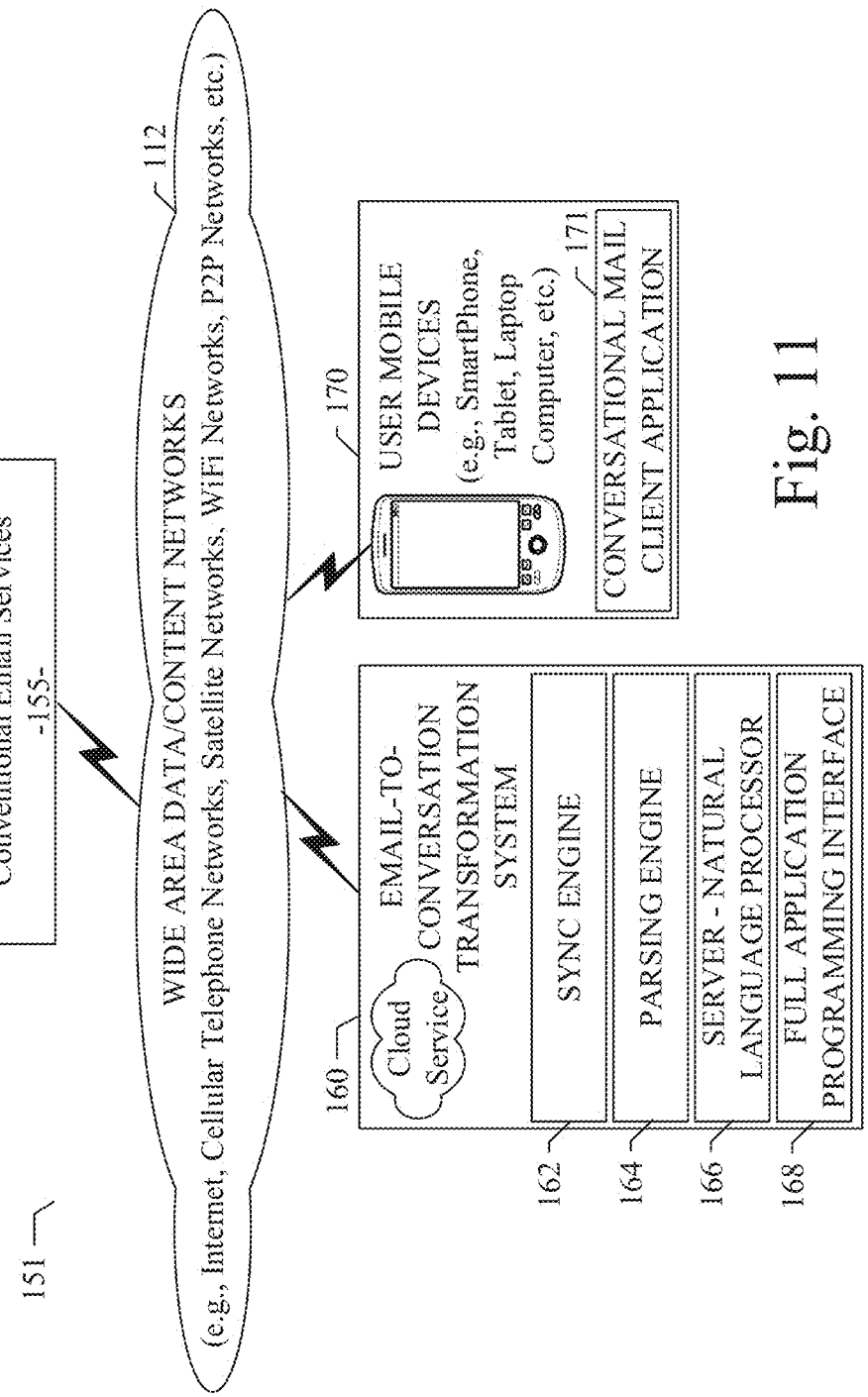

FIG. 10 illustrates the processing components of an example embodiment implemented as a full cloud/light client solution. The example embodiment of the full cloud/light client solution can also be described with reference to FIG. 11. The example embodiment, shown in FIGS. 10 and 11, is implemented as a full cloud/light client solution, wherein most of the intensive email parsing and natural language processing is performed in the cloud at the cloud server 160. In particular, as illustrated in the environment 151 of FIG. 11, client device 170 (e.g., a mobile client device) is shown to include a conversational email client application 171, which can provide a user interface on the client device 170 for presentation and interaction with the expressive conversations generated by the transformation system 160. Note that the client device 170 in this embodiment does not include and does not need the parsing engine or the natural language processor; because, these email processing operations are performed on the cloud server by the transformation system 160. As a result, the client device 170 can be minimally configured.

Referring now to FIGS. 10 and 11, the full cloud/light client solution of an example embodiment uses the Sync Engine 162 of transformation system 160 to interface with the conventional email services 155 via network 112 in real time and monitor changes in an email user's email inbox and outbox. In this manner, the operation of the transformation system 160 can be synchronized in real time with an email client's account with the conventional email services 155 (e.g., Gmail™, Yahoo™, etc.). When a new email is received, the Sync Engine 162 can cause activation of the Parsing Engine 164 and the Server—Natural Language Processor (NLP) 166 of transformation system 160. The Sync Engine 162 can further send a push notification to the conversational email client application 171 of client device 170 to alert the client device 170 of the new email message.

Upon receipt of the new email message, the Parsing Engine 164 of transformation system 160 can process the incoming email message by recognizing and hiding or suppressing email closings, and hiding unnecessary data and signature lines from the email while retaining the conversational email content. The conversational email content can be considered the portions of the email content that are not email closings, unnecessary data, signature lines, routing data, or other content portions that are not relevant to the conversation between two or more email client users. In other words, the conversational email content can be considered the portions of the email content that are directly relevant to the conversation between two or more email client users. The Parsing Engine 164 can extract the essential content and metadata from the email message, hiding or suppressing the rest of the email data, and transforming the email into an expressive conversation similar to the familiar text messenger-like view and conversational experience. In addition to signatures and closings, the Parsing Engine 164 can also hide or suppress extensive automatically-generated information from the entire email or email thread. Consequently, the actual conversational email content is identified and retained by hiding the recognized email closings, unnecessary data and signature lines. In a particular embodiment, the Parsing Engine 164 can use machine learning technology to identify and retain the conversational content from the email message and to reformat the email content into a new presentation resembling a text message dialogue. As described above, the Parsing Engine 164 of an example embodiment can use machine learning techniques to train on a large data set of the most widely used email service providers and email formats to determine the similarities/models of each of a plurality of email format samples. As a result, the Parsing Engine 164 can determine which information content in the email is unnecessary for the presentation of the expressive conversation. Additionally, the Parsing Engine 164 in an example embodiment is responsible for re-formatting the email and email threads using a bubble chat style format, thereby transforming the email thread into the expressive conversation 145. In some embodiments, any other suitable chat-style format may be used to present the email as an expressive conversation. The actual conversational email content is delivered to the user of client device 170 as an expressive conversation similar to text messaging.

The newly received email message can also be processed by the Server—Natural Language Processor (NLP) 166 of transformation system 160 using the cloud server to extract information from the content and context of the received emails. Natural language processing techniques can be employed for this extraction. The Server—NLP 166 can provide named entity recognition and a more complete understanding of the conversation in the context of the received email thread.

Once the received email has been processed into an expressive conversation by the transformation system 160 at the cloud server as described above, the expressive conversation becomes available for download to the client device 170 via the Full Application Programming Interface (API) 168. The conversational email client application 171 of client device 170 can make API calls to the transformation system 160 to fetch the expressive conversation corresponding to the newly received email. As additional emails of the thread are received, the incoming emails can be processed into expressive conversations by the transformation system 160 and downloaded to client system 170 and the conversational email client application 171 therein via API 168. Because the conversational email client application 171 receives push notifications from Sync Engine 162 as described above, the conversational email client application 171 knows when to perform the API calls to fetch new portions of the expressive conversation. Thus, the full cloud/light client solution of an example embodiment enables a client device user to receive email message threads as expressive conversations with the email message parsing and processing being performed by a cloud service.

Figure 12:
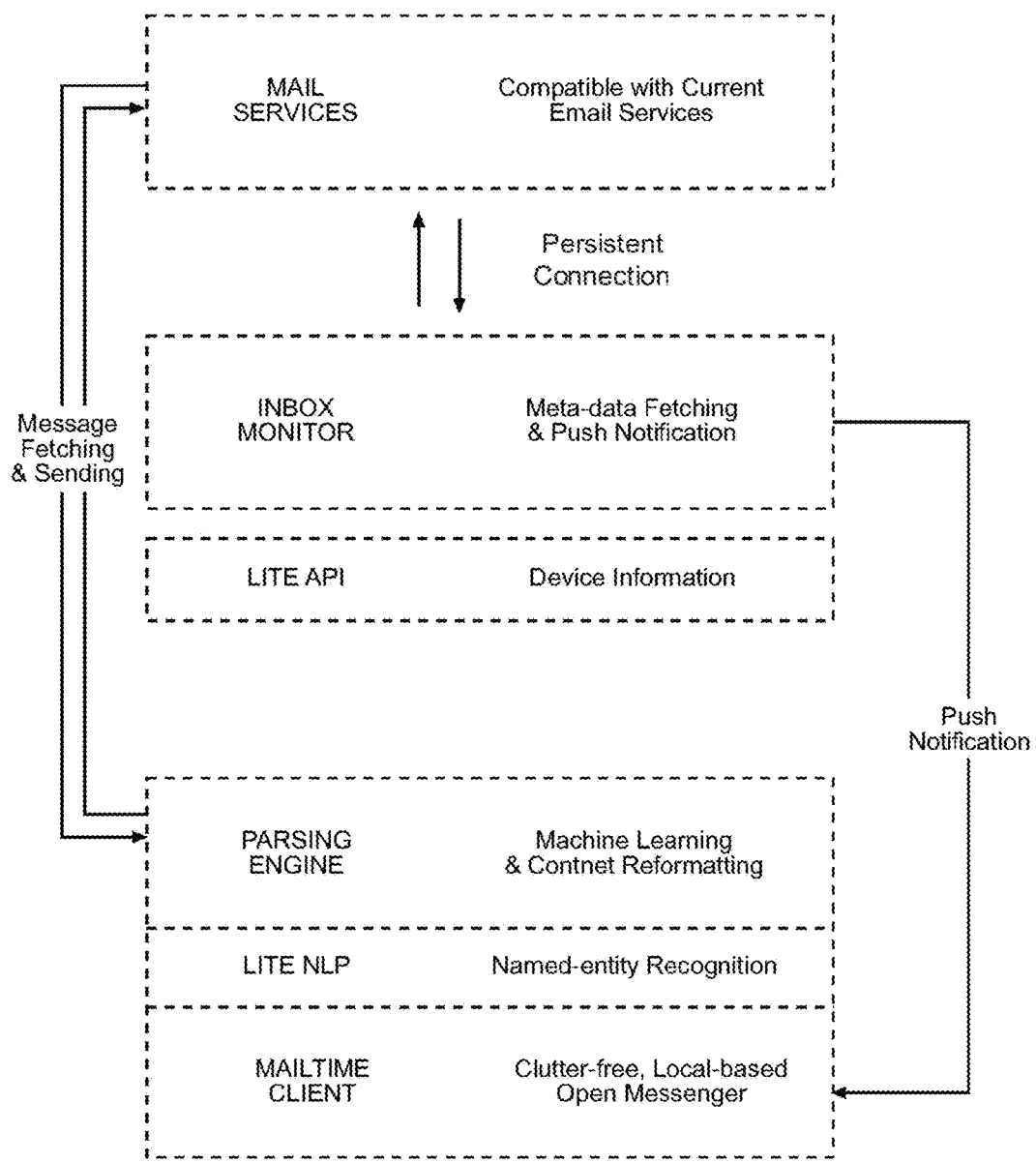
FIGS. 12 and 13 illustrate the processing components of an example embodiment implemented as a full client/light cloud solution.
Figure 13:
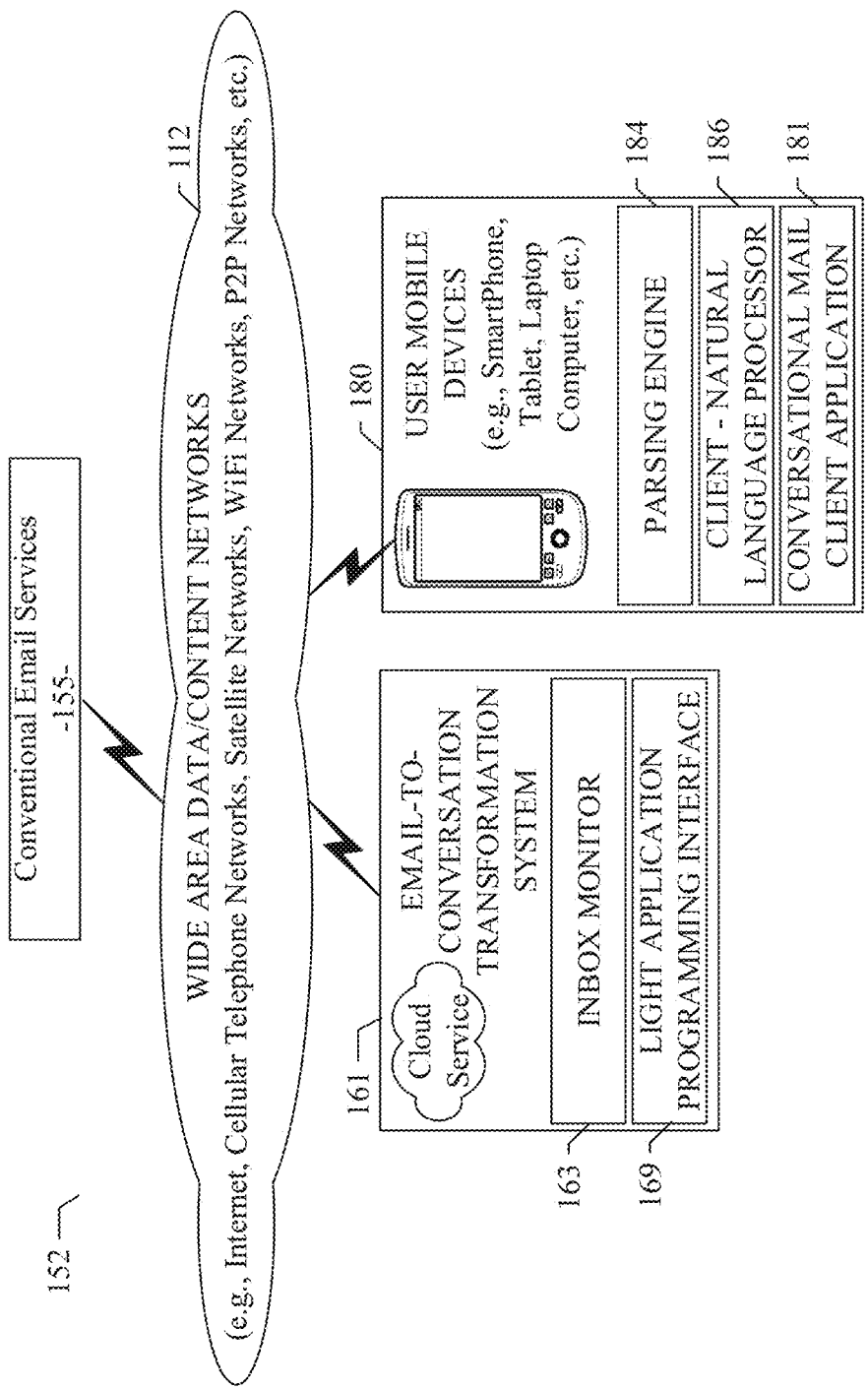

FIG. 12 illustrates the processing components of an example embodiment implemented as a full client/light cloud solution. The example embodiment of the full client/light cloud solution can also be described with reference to FIG. 13. The example embodiment, shown in FIGS. 12 and 13, is implemented as a full client/light cloud solution, wherein most of the intensive email parsing and natural language processing can be performed on the client system 180. In particular, as illustrated in the environment 152 of FIG. 13, client device 180 (e.g., a mobile client device) is shown to include a conversational email client application 181, a Parsing Engine 184, and a Client—Natural Language Processor (NLP) 186. The conversational email client application 181 can provide a user interface on the client device 180 for presentation and interaction with the expressive conversations generated by the Parsing Engine 184 and Client—NLP 186. Note that the cloud service 161 in this embodiment does not include and does not need the server side parsing engine or the natural language processor; because, these email processing operations are performed on the client device 180 by the Parsing Engine 184 and Client—NLP 186. As a result, the cloud service 161 can be minimally configured.

Referring now to FIGS. 12 and 13, the full client/light cloud solution of an example embodiment uses the email client application 181 to send email account credentials to the Inbox Monitor 163 of cloud system 161 via the Light Application Programming Interface (API) 169. The Light API 169 can be triggered when the client device 180 user adds a new email account (e.g., a new email account log-in). In addition, information such as a device identifier and platform-specific data like Apple™ push device tokens are also sent via the Light API 169. The Inbox Monitor 163 of cloud system 161 can use the email account credentials to establish a connection and interface with the conventional email services 155 via network 112 in real time. The Inbox Monitor 163 can monitor changes in an email user's email inbox and outbox. The Inbox Monitor 163 can further send a push notification to the conversational email client application 181 of client device 180 to alert the client device 180 of the new email message. In contrast to the full cloud/light client solution described above, the full client/light cloud solution directly synchronizes the operation of client device 180 in real time with the conventional email services 155 (e.g., Gmail™, Yahoo™, etc.). As such, email synchronization happens on the client device 180. When a new email is received, the Parsing Engine 184 and the Client—Natural Language Processor (NLP) 186 of client device 180 are activated.

Upon receipt of the new email message, the Parsing Engine 184 of client device 180 can process the incoming email message by recognizing and hiding or suppressing email closings, and hiding unnecessary data and signature lines from the email while retaining the conversational email content. As described above for Parsing Engine 164, the Parsing Engine 184 can extract the essential content and metadata from the email message, hiding or suppressing the rest of the email data, and transforming the email into an expressive conversation similar to the familiar text messenger-like view and conversational experience. In a particular embodiment, the Parsing Engine 184 can use machine learning technology to identify and retain the conversational content and to reformat the email content into a new presentation resembling a text message dialogue. As described above, the Parsing Engine 184 of an example embodiment can use machine learning techniques to train on a large data set of the most widely used email service providers and email formats to determine the similarities/models of each of a plurality of email format samples. The trained models of the Parsing Engine 184 can be downloaded to the client device 180 and regularly updated from the cloud server 161. As a result, the Parsing Engine 184 operating on the client device 180 can determine which information content in the email is unnecessary for the presentation of the expressive conversation. Additionally, the Parsing Engine 184 in an example embodiment is responsible for re-formatting the email and email threads using a bubble chat style format, thereby transforming the email thread into the expressive conversation 145. In some embodiments, any other suitable chat-style format may be used to present the email as an expressive conversation.

The newly received email message can also be processed by the Client-Natural Language Processor (NLP) 186 of client device 180 using the client device to extract information from the content and context of the received emails.

Natural language processing techniques can be employed for this extraction. The Client-NLP 186 can provide named entity recognition and a more complete understanding of the conversation in the context of the received email thread. The completely processed email content is available to the user of client device 180 as an expressive conversation similar to text messaging via the conversational email client application 181. As additional emails of the thread are received, the incoming emails can be processed into expressive conversations by the Parsing Engine 184 and the Client NLP 186. The expressive conversations can be presented to the user of client device 180 via the conversational email client application 181. Because the Parsing Engine 184 is synchronized with the conventional email services 155 as described above, the Parsing Engine 184 can fetch and send email messages directly between the conventional email services 155 and the client device 180. Thus, the full client/light cloud solution of an example embodiment enables a client device user to receive email message threads as expressive conversations with the email message parsing and processing being performed by the client device.

Figure 14:
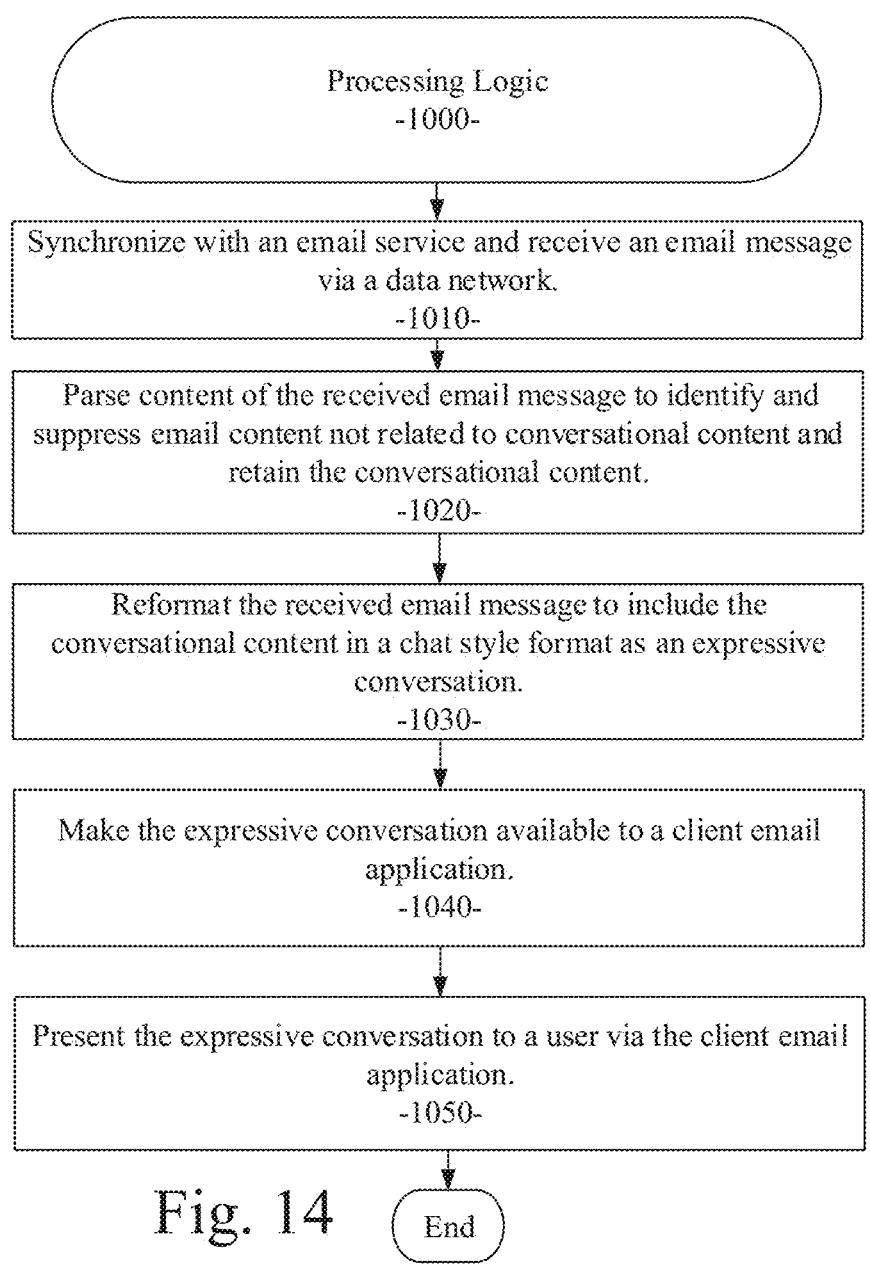
FIG. 14 is a flow chart illustrating a method for delivering emails as expressive conversations on mobile interfaces, according to the embodiments as disclosed herein.

FIG. 14 is a flow chart illustrating a method for delivering emails as expressive conversations on mobile interfaces, according to the embodiments as disclosed herein. In an example embodiment, the method 1000 includes: synchronizing with an email service and receiving an email message via a data network (processing block 1010); parsing content of the received email message to identify and suppress email content not related to conversational content and retaining the conversational content (processing block 1020); reformatting the received email message to include the conversational content in a chat style format as an expressive conversation (processing block 1030); making the expressive conversation available to a client email application (processing block 1040); and presenting the expressive conversation to a user via the client email application (processing block 1050).

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the various embodiments described herein may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the various embodiments described herein or their features may have different names, divisions and/or formats.

Furthermore, as will be apparent to one of ordinary skill in the relevant art, the portions, modules, agents, managers, components, functions, procedures, actions, layers, features, attributes, methodologies and other aspects of the various embodiments described herein can be implemented as software, hardware, firmware or any combination of the three. Of course, wherever a component of the various embodiments described herein is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the various embodiments described herein are in no way limited to implementation in any specific programming language, or for any specific operating system or environment.

Furthermore, it will be readily apparent to those of ordinary skill in the relevant art that where the various embodiments described herein are implemented in whole or in part in software, the software components thereof can be stored on computer readable media as computer program products. Any form of computer readable medium can be used in this context, such as magnetic or optical storage media. Additionally, software portions of the various embodiments described herein can be instantiated (for example as object code or executable images) within the memory of any programmable computing device.

As will be understood by those familiar with the art, the various embodiments described herein may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the various embodiments described herein or their features may have different names, divisions and/or formats. Accordingly, the disclosure of the various embodiments is intended to be illustrative, but not limiting, of the scope of the invention, which is set forth in the following claims.

What is claimed is:

1. A computer-implemented method to improve network communications between users via email, the method comprising:
   synchronizing with an email service and receiving an email message via a data network;
   parsing content of the received email message to identify and suppress email content not related to conversational content and retaining the conversational content, the identifying email content including recognizing email closing words in the email message, the email closing words corresponding to email metadata and signature lines not related to the conversational content, the suppressing email content including hiding the email metadata and signature lines corresponding to the email closing words;
   reformatting the received email message to include the conversational content in a chat style format as an expressive conversation, the formatting the expressive conversation including formatting each response of the users in a bubble of a bubble chat style format, the bubble for each response configured for presentation on a right side, left side, or alternative side of a user interface, depending on an identity of a user who entered each response;
   making the expressive conversation available to a client email application; and
   presenting the expressive conversation to a user via the client email application.

2. The method of claim 1 wherein the parsing and reformatting is performed on a cloud server.

3. The method of claim 1 wherein the parsing and reformatting is performed on a client device.

4. The method of claim 1 wherein the synchronizing includes synchronizing email inbox and outbox changes and updates directly with a conventional email service.

5. The method of claim 1 wherein the synchronizing includes synchronizing an email cloud service with a conventional email service.

6. The method of claim 1 wherein the synchronizing includes synchronizing an email client with a conventional email service.

7. The method of claim 1 wherein the parsing includes suppressing email closings, email metadata, and email signature lines.

8. The method of claim 1 wherein the parsing includes grouping and ordering or sorting a plurality of email messages of an email thread so the expressive conversation is presented as temporally sequenced comments by each of the originators of the plurality of email messages.

9. The method of claim 1 wherein the parsing includes using machine learning techniques to identify and suppress email content not related to the conversational content.

10. The method of claim 1 including performing natural language processing on the content of the received email message to extract information from the content and context of the received email message.

11. A system to improve network communications between users via email, the system comprising:
a cloud server including:
a sync engine to synchronize the cloud server with an email service and to receive an email message via a data network,
a parsing engine to parse content of the received email message to identify and suppress email content not related to conversational content and to retain the conversational content, the parsing engine being configured to recognize email closing words in the email message, the email closing words corresponding to email metadata and signature lines not related to the conversational content, the parsing engine being further configured to suppress email content including hiding the email metadata and signature lines corresponding to the email closing words, the parsing engine further to reformat the received email message to include the conversational content in a chat style format as an expressive conversation, the parsing engine being further configured to reformat each response of the users in a bubble of a bubble chat style format, the bubble for each response configured for presentation on a right side, left side, or alternative side of a user interface, depending on an identity of a user who entered each response; and
a client device in data communication with the cloud server via the data network, the client device including a client email application to present the expressive conversation to a user.

12. The system of claim 11 wherein the parsing engine being further configured to suppress email closings, email metadata, and email signature lines.

13. The system of claim 11 wherein the parsing engine being further configured to group and order or sort a plurality of email messages of an email thread so the expressive conversation is presented as temporally sequenced comments by each of the originators of the plurality of email messages.

14. The system of claim 11 wherein the parsing engine being further configured to use machine learning techniques to identify and suppress email content not related to the conversational content.

15. The system of claim 11 wherein the cloud server being further configured to perform natural language processing on the content of the received email message to extract information from the content and context of the received email message.

16. A system to improve network communications between users via email, the system comprising:
a cloud server including:
an inbox monitor to monitor an email service for a received email message, and
an application programming interface to enable communication with a client device; and
a client device in data communication with the cloud server via a data network, the client device including:
a parsing engine to synchronize the client device with an email service and to receive an email message via a data network, the parsing engine being further configured to parse content of the received email message to identify and suppress email content not related to conversational content and to retain the conversational content, the parsing engine being configured to recognize email closing words in the email message, the email closing words corresponding to email metadata and signature lines not related to the conversational content, the parsing engine being further configured to suppress email content including hiding the email metadata and signature lines corresponding to the email closing words, the parsing engine being further configured to reformat the received email message to include the conversational content in a chat style format as an expressive conversation, the parsing engine being further configured to reformat each response of the users in a bubble of a bubble chat style format, the bubble for each response configured for presentation on a right side, left side, or alternative side of a user interface, depending on an identity of a user who entered each response; and
a client email application to present the expressive conversation to a user.

17. The system of claim 16 wherein the parsing engine being further configured to suppress email closings, email metadata, and email signature lines.

18. The system of claim 16 wherein the parsing engine being further configured to group and order or sort a plurality of email messages of an email thread so the expressive conversation is presented as temporally sequenced comments by each of the originators of the plurality of email messages.

19. The system of claim 16 wherein the parsing engine being further configured to use machine learning techniques to identify and suppress email content not related to the conversational content.

20. The system of claim 16 wherein the cloud server being further configured to perform natural language processing on the content of the received email message to extract information from the content and context of the received email message.

* * * * *